3,462,247
PREPARATION OF PHOSPHONITRILIC CHLORIDE POLYMERS
Norman Lovelace Paddock, Wolverhampton, and Harold Trevor Searle, Birmingham, England, assignors, by mesne assignments, to Hooker Chemical Corporation, New York, N.Y., a corporation of New York
No Drawing. Continuation of application Ser. No. 807,748, Apr. 21, 1959. This application Aug. 7, 1964, Ser. No. 388,291
Int. Cl. C01b 25/00, 21/00, 7/02
U.S. Cl. 23—357      2 Claims

ABSTRACT OF THE DISCLOSURE

The time for the reaction, in solution, of phosphorus pentachloride with ammonium chloride to form polyphosphonitrilic chlorides is materially reduced by incorporating in the reaction medium, as catalyst, a metallic salt which is capable of forming a coordination complex with ammonia or an amine.

---

This application is a continuation of applicant's co-pending application Ser. No. 807,748, filed Apr. 21, 1959.

This invention is for improvements in or relating to a process for the production of phosphonitrilic chloride polymers, such process being more rapid than those known hitherto.

The reaction of phosphorus pentachloride with ammonium chloride in refluxing tetrachloroethane solvent, carried out as described by Schenk and Romer in Berichte 57B, 1343 (1924), has the great disadvantage that it takes several hours to reach completion. Normally, the time required to ensure complete reaction, according to this prior method, would be between 7 and 8 hours. Of course, other solvents may be used instead of tetrachloroethane in this type of reaction and when, for instance, monochlorobenzene is used as solvent in a Schenk and Romer type reaction, the time required for complete reaction is of the order of 25 to 30 hours.

We have now found that the addition of small amounts of a metallic salt, which can form a co-ordination complex with ammonia or an amine, to the reactant mixture reduces the time of reaction very considerably. Thus, in the Schenk and Romer reaction with tetrachloroethane as solvent, the use of such a metallic salt reduces the reaction time to around 4 or 5 hours, and in some cases to as low as 1½ to 2 hours, depending on the metallic salt employed; and when using monochlorobenzene as solvent, the reaction time is reduced to between 5 and 10 hours.

In this catalytic reaction the metallic salts must, of course, be used in their anhydrous form, since water would react with the phosphorus pentachloride thereby reducing the yield of phosphonitrilic chloride.

One of the advantages of this invention is that monochlorobenzene may be conveniently used as solvent in the Schenk and Romer reaction and this is highly desirable since this solvent has a lower boiling point than tetrachloroethane and therefore may be more readily removed from the product at the end of the reaction. Further advantages of this solvent over tetrachloroethane are that it is cheaper and less toxic. Thus the use of the metallic salts as catalysts in the Schenk and Romer reaction allows some latitude in the choice of solvent for the reaction. The advantages of this invention are not confined to the normal method of making the polymeric phosphonitrilic chlorides, i.e. the method of Schenk and Romer. The metallic salts are equally effective in reducing the reaction time of the improved method of preparation of these polymers described in copending application No. 807,749, filed Apr. 21, 1959, now abandoned. So that, by using a metallic salt together with the slow addition of the phosphorus pentachloride therein described, we obtain greater yields of the phosphonitrilic chloride polymers in about half the time.

According to the present invention, there is provided a process for the production of phosphonitrilic chloride polymers which comprises heating phosphorus pentachloride with ammonium chloride in a solvent in the presence of a small quantity of an anhydrous co-ordinating metallic salt, as hereinbefore defined.

In general, we have found that a molar concentration of up to 10% of the metallic salt is a suitable amount of catalyst to use. In a typical case when a 1% molar concentration is used, the reaction time is halved, so that the reaction is complete in 4–4½ hours. Furthermore, when a molar concentration of 10% is used, the reaction is substantially completed in 2–2½ hours.

The extent of the reduction in the reaction time depends also on the particular metallic salt employed. Using a 5% molar concentration of anhydrous aluminum chloride, the reaction time is reduced to 5–5½ hours, whereas, if the same concentration of anhydrous manganous chloride is used, the reaction is substantially completed after 3–3½ hours.

Examples of suitable metallic salts for use in the present invention include: anhydrous cobaltous chloride, anhydrous aluminum chloride, anhydrous manganous chloride, anhydrous cupric chloride, anhydrous stannic chloride, anhydrous magnesium chloride, anhydrous zinc chloride and anhydrous titanium tetrachloride.

The following examples serve to illustrate the invention.

In the following Examples 1–9, 625.5 grams (3.0 moles) of phosphorus pentachloride was heated with 176.5 grams (3.3 moles) of ammonium chloride and small amounts of metal chloride in 1.0 litre of symmetrical tetrachloroethane solvent at reflux temperature until the evolution of hydrogen chloride from the reaction had subsided.

Example 1

Using 39.0 grams of anhydrous cobaltous chloride (0.3 mole, 10% molar concentration) as catalyst the reaction was completed in 2 to 2½ hours.

Example 2

The use of 4.0 grams of anhydrous cobaltous chloride (0.03 mole, 1% molar concentration) as catalyst enabled the reaction to be completed in 4 to 4½ hours.

Example 3

Using 20.0 grams of anhydrous aluminum chloride (0.15 mole, 5% molar concentration) as catalyst the reaction was completed after 5 to 5½ hours.

Example 4

The use of 18.8 grams of anhydrous manganous chloride (0.15 mole, 5% molar concentration) reduced the reaction time to from 3 to 3½ hours.

Example 5

When 20.1 grams of anhydrous cupric chloride (0.15 mole, 5% molar concentration) was used as catalyst, the reaction was complete after 3½ to 4 hours.

Example 6

Stannic chloride (39.1 grams, 0.15 mole, 5% molar concentration) as catalyst reduced the reaction time to from 3 to 3½ hours.

Example 7

When 14.3 grams of anhydrous magnesium chloride (0.15 mole, 5% molar concentration) was used as catalyst the reaction time was approximately 2½ hours.

Example 8

When the catalyst was 20.5 grams of anhydrous zinc chloride (0.15 mole, 5% molar concentration) the reaction time was only 1½ to 2 hours.

Example 9

With 28.5 grams of anhydrous titanium tetrachloride (0.15 mole, 5% molar concentration) as catalyst the reaction was completed in 4½ to 5 hours including an apparent initial induction period of approximately 1 hour.

In the following examples the effect of a catalyst on the reaction in monochlorobenzene as a solvent is made apparent.

Example 10

(a) Phosphorus pentachloride (144 pounds) and 40.5 pounds of ammonium chloride were heated together in 304 pounds of refluxing monochlorobenzene for 32 hours, the yield of phosphonitrilic chlorides being 74 pounds.

(b) In another experiment 159.5 pounds of phosphorus pentachloride, 45.2 pounds of ammonium chloride, and 0.85 pound of anhydrous zinc chloride were heated together in 338 pounds of refluxing monochlorobenzene for 10½ hours. The yield of phosphonitrilic chlorides was 84 pounds.

Example 11

(a) Phosphorus pentachloride (208.3 grams) and 58.9 grams of ammonium chloride were heated together in 400 milliliters of refluxing monochlorobenzene for 25 hours. The yield of phosphonitrilic chlorides was 114 grams.

(b) In another experiment 208 grams of phosphorus pentachloride, 59.0 grams of ammonium chloride and 1.36 grams of anhydrous zinc chloride were heated together in 400 milliliters of refluxing monochlorobenzene for 5¼ hours. The yield of phosphonitrilic chlorides obtained was 116 grams.

In the processes of any of the foregoing examples, the phosphorus pentachloride may be added slowly to the hot solvent containing ammonium chloride whereby the proportion of cyclic polymers is increased.

What is claimed is:

1. In a process for the production of polyphosphonitrilic chlorides from a solution of phosphorus pentachloride and a molar excess of ammonium chloride under the influence of heat, the improvement wherein the solution contains a catalyst consisting of an anhydrous metallic salt which is capable of forming a coordination complex with ammonia and amines.

2. In a process for the production of polyphosphonitrilic chlorides by reaction between phosphorus pentachloride and a molar excess of ammonium chloride under the influence of heat and in a solvent selected from the group consisting of monochlorobenzene and tetrachloroethane, the improvement wherein the solvent contains a catalyst consisting of an anhydrous metallic salt which is capable of forming a coordination complex with ammonia and amines.

References Cited

UNITED STATES PATENTS

| | | | |
|---|---|---|---|
| 2,782,133 | 2/1957 | Vallette | 23—357 X |
| 3,236,870 | 2/1966 | Branan et al. | 23—357 X |
| 3,249,397 | 5/1966 | Nichols | 23—357 |

OTHER REFERENCES

Audrieth et al.: "Chemical Reviews," vol. 32, pp. 111–114 (1943).

Bode et al.: "Berichte," vol. 75B, pp. 215–226 (1942).

Gmelin: "Handbuch der Anorganischen Chemie," 7th edition, 1914, vol. V, part 2, p. 726.

Roscoe et al.: "Treatise On Chemistry," 1907, vol. II, p. 692.

Schmulbach: "Progress In Inorganic Chemistry," vol. 4, p. 311 (1962).

OSCAR R. VERTIZ, Primary Examiner

HOKE S. MILLER, Assistant Examiner